Jan. 7, 1941. E. M. CHANCE 2,228,199
CONTROL APPARATUS OF THE FOLLOW-UP TYPE
Filed March 13, 1939 3 Sheets-Sheet 1

Inventor
Edwin M. Chance
by his Attorneys
Howson & Howson

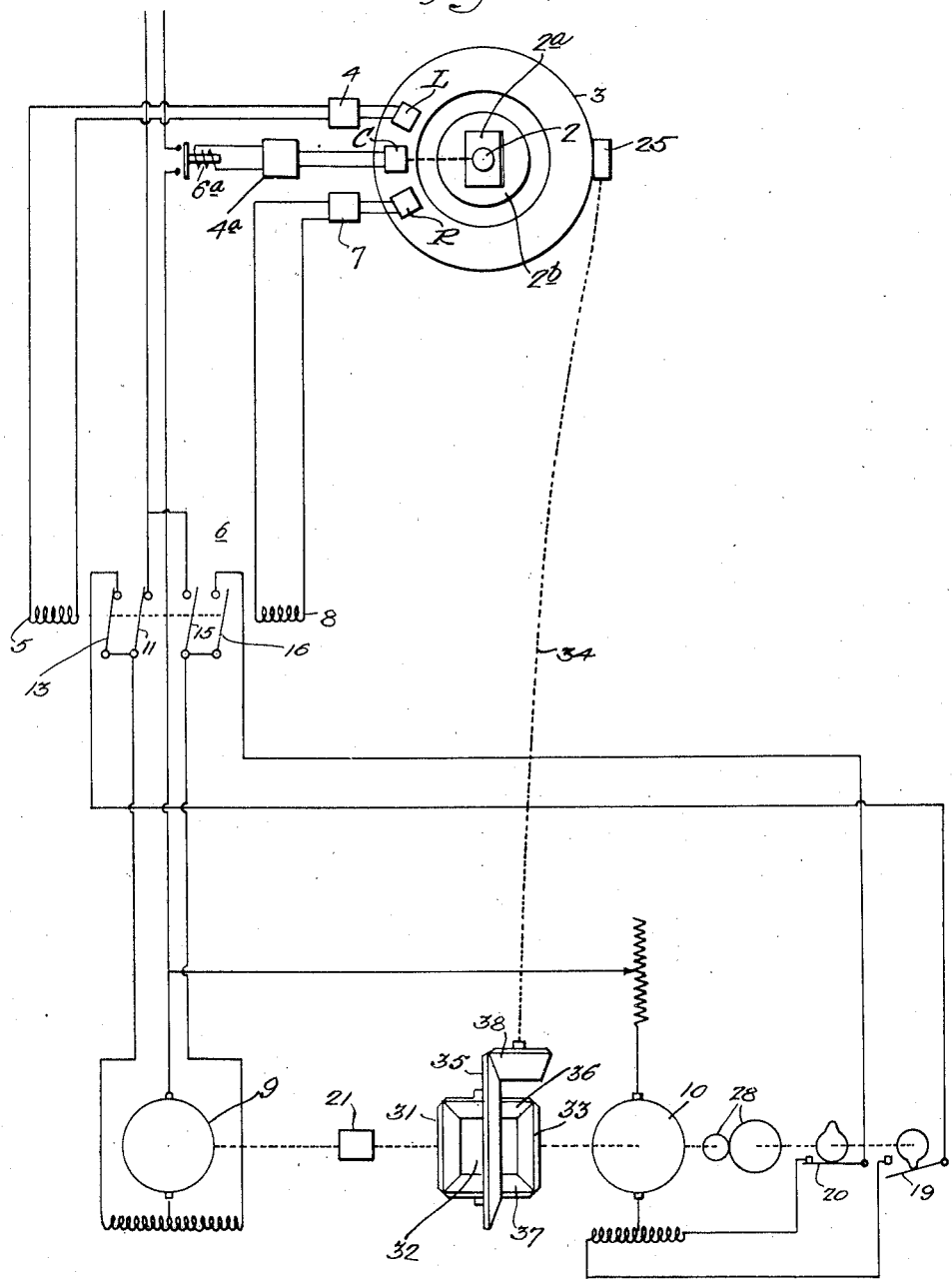

Jan. 7, 1941. E. M. CHANCE 2,228,199
CONTROL APPARATUS OF THE FOLLOW-UP TYPE
Filed March 13, 1939 3 Sheets-Sheet 3
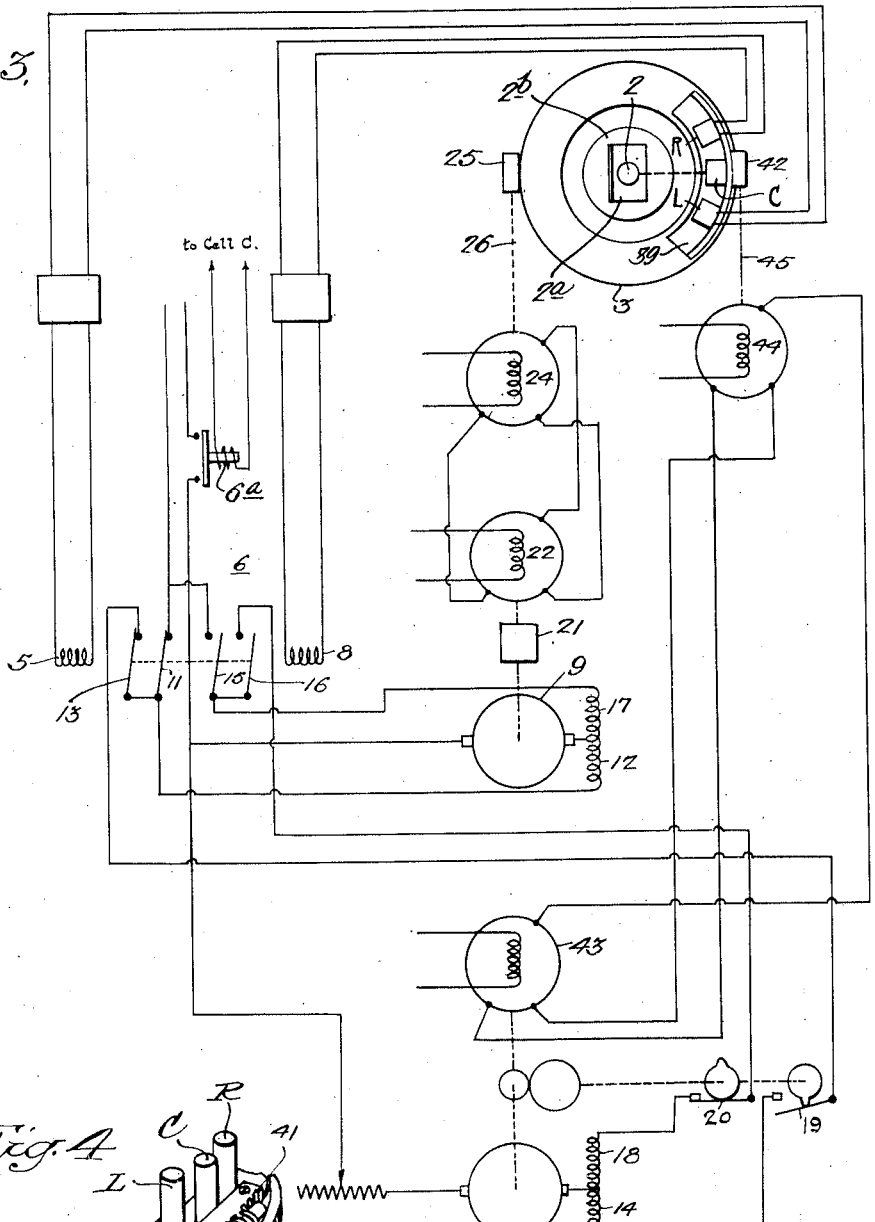
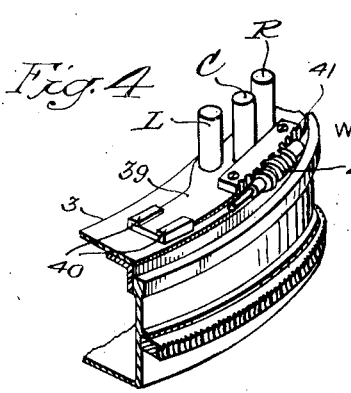
Inventor
Edwin M. Chance
by his Attorneys
Howson & Howson Patented Jan. 7, 1941

2,228,199

UNITED STATES PATENT OFFICE 2,228,199

CONTROL APPARATUS OF THE FOLLOW-UP TYPE

Edwin M. Chance, Haverford, Pa., assignor to Britton Chance, Mantoloking, N. J.

Application March 13, 1939, Serial No. 261,639

12 Claims. (Cl. 172—239)

This invention relates to electrical control apparatus of the follow-up type and, more particularly, to a novel system of this character wherein the follow-up action is effected in a novel manner to produce varying control effects.

Electrical control systems of the follow-up type may be said to include generally some control means including relatively movable elements, a telemotor system operable by the control means for performing the desired control action, and a follow-up system operable by the telemotor to produce follow-up relative movement between the said control elements so as to restore the normal quiescent condition of the control means. Thus, in the case of an automatic steering system for dirigible craft, such as ships, there is provided some control means constructed and arranged to be responsive to deviations of a craft from its course, a telemotor system including a steering motor operable by the control means to effect throw of the craft's steering rudder, and a follow-up system operable by the telemotor to restore the control means to its normal quiescent condition.

Since any telemotor system will inherently introduce error whenever the direction of operation changes, due to time lag in the operation of its parts, it is practically necessary to compensate for such error. Further, in the case of an automatic steering system, it is frequently desired to give the rudder a relatively great throw whenever the craft changes its direction of yaw, the rudder throw being in a direction to tend to overcome the yaw or deviation and bring the craft back on its course. This action, which is commonly referred to as "initial rudder" is introduced by causing the steering motor to operate for a relatively long period of time when the direction of the craft's yaw changes.

By the present invention, there are provided novel methods and means for compensating for telemotor error and, if desired, for introducing initial rudder action. While the invention is applicable generally to control systems of the follow-up type, it will be described with particular reference to an automatic steering system since it is particularly adapted for use in such a system.

The principal object of the invention is to provide in a system of the stated character novel means for producing and combining different effects so as to produce a resultant follow-up action which compensates for telemotor error and which may also introduce initial rudder action whenever desired.

Other more specific objects of the invention, as well as the novel features thereof, may be more clearly understood by reference to the accompanying drawings.

In the drawings:

Fig. 2 is a diagrammatic illustration of another form of the invention employing a mechanical differential system;

Fig. 3 is a similar illustration of a further form of the invention employing simple "Selsyn" systems in a novel manner; and Fig. 4 is a fragmentary perspective view illustrating the mounting of the light-sensitive cells employed in the apparatus of Fig. 3.

Figure 1:
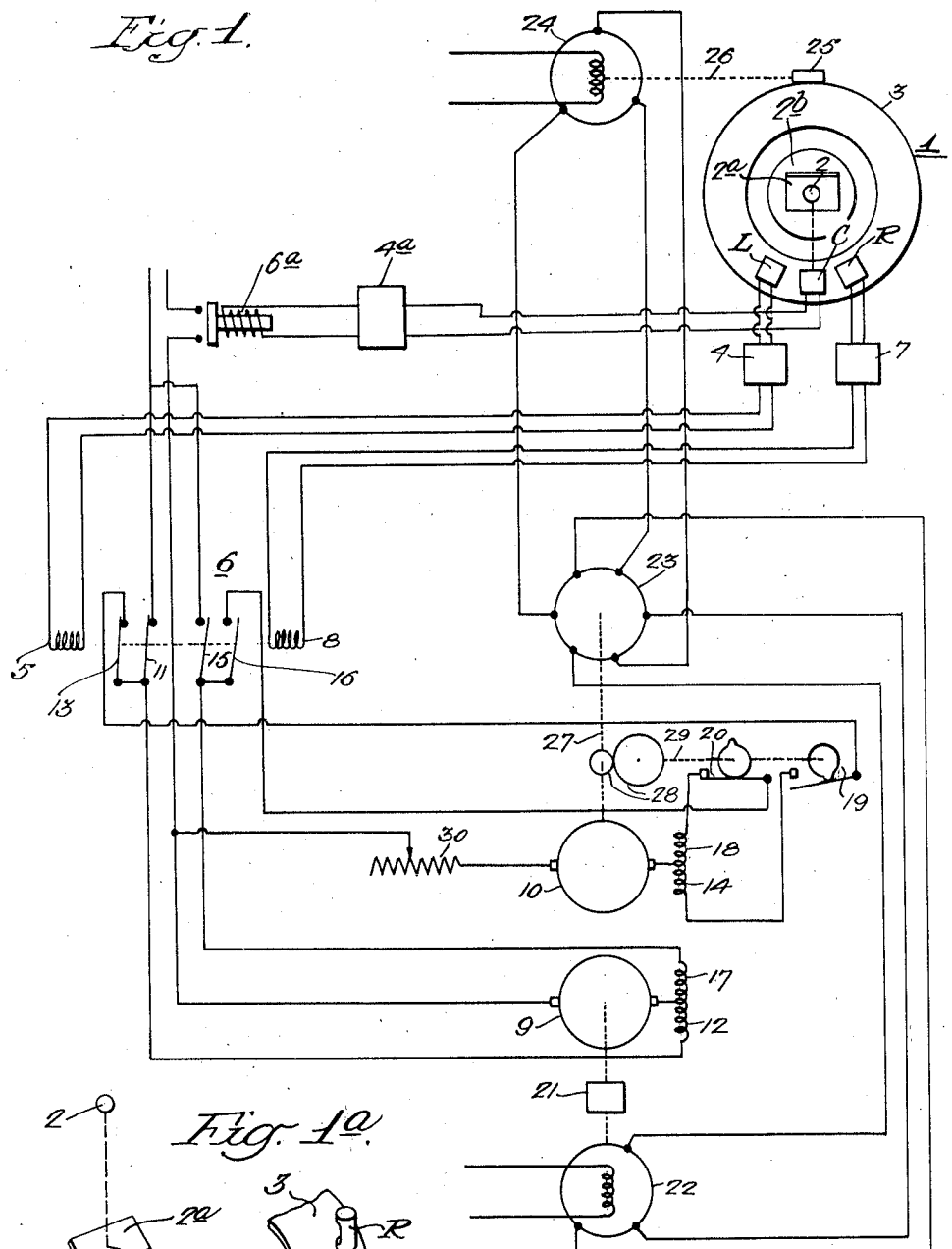
Fig. 1 is a diagrammatic illustration of one form of the invention employing an electrical differential system including self-synchronous devices.
Figure 1A:
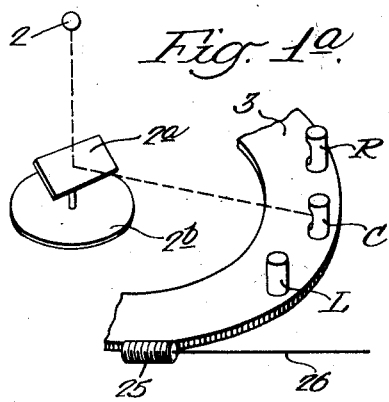
Fig. 1A is a diagrammatic illustration of the control device.

Referring first to Figs. 1 and 1A, there is provided a control device 1 which in the present instance is of the type employing light-sensitive cells, although this control device may be any device of the type comprising relatively movable elements constructed and arranged for relative movement in response to some condition variation which it is desired to control. In the illustrated device, 2 represents a source of a light beam disposed above a reflector 2a which is carried by a compass card 2b; 3 is a cell supporting plate or ring rotatable relative to the beam about a center axis in response to variation of the condition being controlled; L and R are left and right hand light cells carried by the support 3; and C is a center cell also carried by the said support. A control device of this general type is illustrated in United States Patent #2,102,511. The reflected beam remains stationary while the cell support moves relative to the beam during control action and follow-up action.

As shown in Fig. 1, the left hand cell L is connected through suitable amplifying apparatus 4 to the winding 5 of a double-acting relay 6. Similarly, the right hand cell R is connected through amplifying apparatus 7 to the winding 8 of the relay. The amplifiers 4 and 7 may be of conventional form; for example, each of them may comprise one or more conventional vacuum tube amplifiers. The purpose of these amplifiers is, of course, to amplify the current impulses generated by the light-sensitive cells.

The relay 6 serves to control the energization of the steering motor 9 and the pilot motor 10, the purpose of which will be described presently.

Each of these motors is reversible and the direction of rotation of each is controlled by the relay 6. The relay may comprise a plurality of movable contact arms operated in unison, as indicated by the broken-line representation. The contact arms may be operated conveniently by means of a single armature to which they may be attached. When the winding 8 is energized, the contact arms are in the position shown, the arm 11 closing a circuit for the steering motor 9 through the field winding 12, and the arm 13 closing a circuit for the pilot motor 10 through switch 19 (when closed) and field winding 14. When the winding 5 is energized, these contact arms are opened and the contact arms 15 and 16 are closed, the arm 15 closing a circuit for the steering motor 9 through its field winding 17, and the arm 16 closing a circuit for the pilot motor 10 through its field winding 18. Thus, the relay 6 serves to energize each motor through one or the other of its field windings to effect operation of the motor in either direction. It will be noted that the energizing circuits for the pilot motor 10 include limit switches 19 and 20, which will be discussed hereinafter.

The center cell C may be connected as illustrated, through amplifier 4a to relay 6a, so that when the cell is activated the supply circuit is opened to deenergize the motors.

The motor 9 in the case of an automatic steering system serves to operate the rudder of the craft, as will be well understood. The portion of the system extending from the control device 1 to and including the motor 9 constitutes the telemotor system above-mentioned. In accordance with the present invention, the rotor of motor 9 is mechanically connected through a suitable control mechanism 21 to the rotor of a self-synchronous device 22. The device 21 may take the form of a conventional manually controlled gear drive to rotate the rotor of device 22 at a desired speed. The device 21, therefore, may be manually adjustable to obtain different speeds of the device 22.

The device 22 forms part of a differential "Selsyn" system comprising a differential self-synchronous device 23 and a self-synchronous receiver device 24. Such a system is a conventional one and requires no detailed description. As is well known, the differential device 23 serves to supply to the receiver 24 the algebraic sum of the energy applied to the transmitter 22 and that applied to the rotor of the differential device. The direction and speed of the rotation of the receiver 24 is dependent upon the relative speeds and directions of rotation of the transmitter 22 and the differential device 23. If these latter devices operate at the same speed but in reverse directions, the receiver 24 will not rotate since the opposing forces applied to the differential device balance one another. If the differential device 23 is operated at a greater speed than the transmitter 22 but in opposite direction with respect thereto, the receiver 24 will rotate at a speed equal to the algebraic sum of the speeds of the other two devices and hence in a direction opposite to that of the transmitter 22. If the differential device 23 is operated at a lower speed than the transmitter 22 and in a direction opposite thereto, the receiver 24 will be operated in the same direction as the transmitter but at a lower speed than that of the transmitter.

In further accordance with the present invention, the receiver 24 is connected to a follow-up worm 25 by suitable means, such as the mechanical connection indicated at 26. The worm 25 engages a worm wheel on the cell support 3. Thus, the receiver 24 serves to drive the cell support 3 in either direction, depending upon its direction of rotation. From the above discussion, it will be seen that the direction and speed of operation of the worm 25 will be determined in any instance by the relative speeds and direction of rotation of the transmitter 22 and the differential device 23. If the differential device 23 is at standstill, the receiver 24 will receive energy from the transmitter 22 in proportion to the speed of the latter just as though these two devices were connected directly. Under such conditions, the normal follow-up action will take place. Thus, the motor 9 will effect follow-up action of the cell support 3 through the medium of the "Selsyn" system.

The purpose of the pilot motor 10 and its associated elements, including device 23, is to vary the follow-up action in a manner to compensate for the telemotor error and to introduce initial rudder action, if desired. The rotor of the pilot motor is connected to the rotor of the differential device by the connection indicated at 27. The shaft 27 drives the cams for the limit switches 19 and 20 through the medium of reduction gearing 28. By having the cams of the limit switches adjustable on the shaft indicated at 29, the action of the limit switches may be varied at will to obtain various results, as set forth hereinafter. In order to vary the speed of the motor 10, there is preferably provided a suitable control device, such as the rheostat 30, included in circuit with the said motor.

The various results which may be obtained by means of this apparatus may be seen by considering the operation of the system as a whole. Assuming for the sake of illustration that the apparatus is employed for automatic steering of a ship, normally with the ship proceeding on its course, the light beam from source 2 will fall on the center cell C and the quiescent state of the system will obtain. The illustrated position of relay 6 and the limit switches 19 and 20 indicate that the last deviation of the ship from its course was in a direction to cause actuation of the right hand cell R. Suppose now that the direction of yaw of the ship changes, causing the cell plate 3 to move about its pivot counter-clockwise as viewed in the figure, thus bringing cell L into alignment with the stationary light beam. As a result, the winding 5 of relay 6 is energized, thus opening contacts 11 and 13 and closing contacts 15 and 16. The resultant energization of the steering motor 9 causes the motor to operate the rudder (not shown) in a direction to bring the craft back on its course. At the same time, the motor 9 operates the transmitter 22 in such direction that for standstill condition of the differential device 23, the receiver 24 will rotate in a direction to actuate the cell plate 3 clockwise thus tending to bring the center cell into coincidence with the beam and energize relay 6a. Simultaneously with the energization of the motor 9, however, the pilot motor 10 is energized through the limit switch 20 and actuates the rotor of the differential device 23 until the motor circuit is opened by the limit switch. By adjusting the limit switches as above mentioned, the actuation of the differential device may be effected for a desired period of time. Moreover, the rate or speed of actuation of the differential device may be varied by varying the speed of the pilot motor by means of the speed-control rheostat 30.

Since the limit switch 19 closes when the limit switch 20 opens, the system is conditioned for operation in the opposite direction whenever the craft changes its direction of yaw. The operation of the system in the opposite direction will be clearly understood from the above description.

Considering now the various effects which are obtainable through the actuation of the differential device by the pilot motor 10, it will be seen that three principal effects may be obtained as follows:

(1) The speed and direction of the differential device and the setting of the limit switch may be such that on excitation of an outer cell and resultant actuation of the transmitter 22 and differential device 23, the receiver 24 may be driven at lower than normal follow-back speed but in the normal follow-back direction, during an adjustable portion of the first deviation in a given direction. The limit switch then opens, the differential device stops, and during the remainder of this deviation, the receiver 24 will be driven at normal follow-back speed.

The limit switch being open for that direction, subsequent deviations in the same direction will cause the receiver 24 to be operated at normal follow-back speed.

(2) The position of the limit switch may be set so that the differential device continues to operate as above mentioned for the full period of the first deviation in a given direction and into subsequent deviations in the same direction. For instance, the operation of the differential device may continue into the middle of the second deviation, the limit switch then stopping the differential device and thereby changing the operation of the receiver 24 to normal follow-back speed.

(3) The differential device may be operated in reverse direction with respect to the transmitter 22 and at a higher speed, during a part of the first deviation in a given direction. In such case, the receiver 24, during the said part of such deviation, is moved in a direction opposite to normal follow-back motion and the cells are moved so that the light beam is further from the central cell than the displacement due to the deviation. The follow-back, therefore, must operate longer to restore the beam onto the central cell. In the latter part of the deviation, the limit switch stops the differential device, and the transmitter 22 then drives the receiver 24 in the normal follow-back direction at normal follow-back speed to restore the light beam onto the central cell.

By any of the above methods of operation, compensation for telemotor error may be effected and various degrees of initial rudder may be obtained. Thus, the system is very flexible and may be readily adapted to meet the requirements in any particular instance.

Referring now to Fig. 2, there is illustrated a modification wherein a mechanical follow-up system having a mechanical differential device is employed. In this instance, the steering motor 9 drives the element 31 of the differential device 32 through the medium of the adjustable drive device 21. The pilot motor 10 drives another element 33 of the differential device. The third principal element of the differential device is connected mechanically to the follow-up worm 25 by any suitable connection such as the flexible shaft indicated at 34. As illustrated, the elements of the differential device 32 which are driven by the motors 9 and 10 may be the opposing relatively movable gears, and the ring gear 35 attached to gears 36 and 37 may drive the gear 38 at the end of shaft 34.

Since the principles of operation are the same as those above described in connection with Fig. 1, it is deemed unnecessary to describe the operation of this device in detail. As will be understood, during stand-still condition of motor 10, the differential device 32 will operate in the manner of a simple gear train to drive the follow-up worm 25 from steering motor 9. When the motor 10 operates, however, the follow-up worm is driven in a direction and at a speed dependent upon the relative directions and relative speeds of the motors 9 and 10. As described above in connection with Fig. 1, various results may be obtained.

In Fig. 3, there is illustrated another form of apparatus wherein two simple "Selsyn" systems are employed instead of the differential system of Fig. 1. In this instance, the light-sensitive cells are mounted on a plate 39 which is movably carried by the main support 3. As shown in Fig. 4, the plate 39 may be movably mounted on support 3 within guides 40. The plate 39 carries a worm-wheel segment 41 with which there is meshed a worm 42, the purpose of which will be described presently. In this case, the transmitter 22 is connected directly to the receiver 24, the differential device of Fig. 1 being eliminated. The pilot motor 10 drives a transmitter 43 which is connected to a receiver 44 which, in turn, drives the worm 42 through the driving connection indicated at 45. Thus, there are two simple systems one between the steering motor 9 and the main follow-up worm 25, and the other between the pilot motor 10 and the auxiliary worm 42.

Considering the operation of this apparatus, when the motor 10 is at standstill, the normal follow-up action is effected by means of the "Selsyn" system 22—24, the worm 25 driving the support 3 in a direction to effect follow-up action. When the motor 10 operates, however, the "Selsyn" system 43—44 operates to drive the worm 42 in a direction and at a speed dependent upon the direction and speed of the motor 10. Since the worm 42 moves the light-sensitive cells relative to support 3, it will be seen that if the direction of movement of plate 39 is in opposition to the follow-up movement of support 3, the resultant follow-up movement will be equal to the difference between these opposing movements, and the restoration of the normal quiescent condition of the apparatus will be delayed until the pilot motor 10 is stopped by the limit switch, at which time the follow-up action will proceed at the normal speed. The net result, of course, is an increase in the time required to restore the normal quiescent condition, thus causing the steering motor to operate for a longer period of time. This action, which takes place whenever the direction of operation reverses, compensates for the telemotor error and may also be made to introduce initial rudder action.

Thus, in this apparatus, there is provided a follow-up system and an auxiliary system which may act in opposition to the follow-up system to vary the follow-up action.

Although several embodiments of the invention have been illustrated and described, it will be apparent that further embodiments are possible within the scope of the appended claims.

I claim:

1. In an electrical controlling apparatus of the follow-up type, control means including relatively movable elements, a telemotor system operable by said control means, an electrical follow-up system operable by said telemotor system to effect follow-up relative movement between said elements, an electrical differential device included in said follow-up system, a motor connected to said differential device so as to vary the operation thereof to thereby vary the follow-up action, a limit switch arranged to control the extent of actuation of said motor, and means responsive to said control means for controlling the energization of said motor.

2. In an electrical control apparatus, control means for effecting operation of the apparatus in either direction, a reversible telemotor system operable by said control means in either direction, a follow-up system operable by said telemotor system to restore the normal condition of said control means, said telemotor system having inherent time lag in the operation of its parts tending to introduce error whenever the direction of operation changes, and means operative only in response to a directional change to vary the speed of the follow-up action in a manner to compensate for the time lag of said telemotor system.

3. In an electrical control apparatus, control means for effecting operation of the apparatus in either direction, a reversible telemotor system operable by said control means in either direction, a follow-up system operable by said telemotor system to restore the normal condition of said control means, said telemotor system having inherent time lag in the operation of its parts tending to introduce error whenever the direction of operation changes, a differential device included in said follow-up system, and means operative only in response to a directional change for varying the operation of said differential device during a predetermined portion of the control action in the new direction, to thereby compensate for the time lag of said telemotor system.

4. In an electrical control apparatus, control means for effecting operation of the apparatus in either direction, said control means including light sensitive means and a support therefor, a reversible telemotor system operable by said control means in either direction, a follow-up system operable by said telemotor system to move said support and thus restore the normal condition of said control means, said telemotor system having inherent time lag in the operation of its parts tending to introduce error whenever the direction of operation changes, and means operative in response to a directional change to move said light sensitive means relative to said support in a predetermined amount sufficient to compensate for the time lag of said telemotor system.

5. In an electrical controlling apparatus of the follow-up type, a control device comprising a light source and light-sensitive means arranged for activation by a light beam from said source whenever relative movement takes place between the beam and the light-sensitive means, a first motor, a second motor, common means operable by said light-sensitive means for controlling the energization of both said motors, additional means for controlling the energization of said second motor only, and follow-up means operable by said motors to effect follow-up relative movement between the light beam and said light-sensitive means.

6. In an electrical controlling apparatus of the follow-up type, control means including relatively movable elements, a first motor, a second motor, means responsive to said control means for controlling the energization of both said motors, additional means for controlling the energization of said second motor only, means operable by said first motor for effecting follow-up relative movement between said elements independently of said second motor, a differential device included in said follow-up means, and means operable by said second motor for varying the operation of said differential device to thereby vary the follow-up action during at least a portion of the control action.

7. In an electrical controlling apparatus of the follow-up type, a light source, a pair of spaced light-sensitive devices, a third light-sensitive device between said first devices, the said light-sensitive devices being arranged for activation by the light beam from said source, a first motor, a second motor, means operable by said third light-sensitive device for maintaining said motors deenergized, means operable by said first light-sensitive devices for controlling the energization of both said motors, additional means for controlling the energization of said second motor only, and follow-up means operable by said motors to effect follow-up relative movement between said light beam and said light-sensitive devices.

8. In an electrical controlling apparatus of the follow-up type, control means including relatively movable elements, a telemotor system operable by said control means, an electrical follow-up system operable by said telemotor system to effect follow-up relative movement between said elements, an electrical differential device included in said follow-up system, means for varying the operation of said differential device to thereby vary the follow-up action, and means for controlling the extent of operation of said last-named means.

9. In an electrical control apparatus, control means for effecting operation of the apparatus in either direction, a reversible telemotor system operable by said control means in either direction, a follow-up system operable by said telemotor system to restore the normal condition of said control means, said telemotor system having inherent time lag in the operation of its parts tending to introduce error whenever the direction of operation changes, means operative only in response to a directional change to vary the speed of the follow-up restoration of said normal condition so as to compensate for the time lag of said telemotor system, and means for controlling the extent of operation of said last-named means.

10. In an electrical control apparatus, a control device comprising a light source and light-sensitive means arranged for activation by a light beam from said source whenever relative movement takes place between the beam and the light-sensitive means, a reversible telemotor system operable by said control device in either direction, a follow-up system operable by said telemotor system to restore the normal condition of said control device, said telemotor system having inherent time lag in the operation of its parts tending to introduce error whenever the direction of operation changes, and means operative only in response to a directional change to vary the speed of the follow-up action in a manner to compensate for the time lag of said telemotor system.

11. In an electrical control apparatus, control means for effecting operation of the apparatus in either direction, a reversible telemotor system operable by said control means in either direction, a follow-up system operable by said telemotor system to restore the normal condition of said control means, said telemotor system having inherent time lag in the operation of its parts tending to introduce error whenever the direction of operation changes, a differential device included in said follow-up system, a motor connected to said differential device so as to vary the operation thereof, to thereby vary the follow-up action and thus compensate for the time lag of said telemotor system, means for energizing said motor only when the direction of operation of the apparatus changes, and means for controlling the extent of operation of said motor.

12. In an electrical control apparatus, control means for effecting operation of the apparatus in either direction, a reversible telemotor system operable by said control means in either direction, a follow-up system operable by said telemotor system to restore the normal condition of said control means, said telemotor system having inherent time lag in the operation of its parts tending to introduce error whenever the direction of operation changes, a mechanical differential device included in said follow-up system, and means operative only in response to a directional change for varying the operation of said differential device during a predetermined portion of the control action in the new direction, to thereby compensate for the time lag of said telemotor system.

EDWIN M. CHANCE.